(12) United States Patent
Lee et al.

(10) Patent No.: US 9,231,273 B2
(45) Date of Patent: Jan. 5, 2016

(54) POSITIVE ELECTRODE ACTIVE MATERIAL FOR LITHIUM SECONDARY BATTERY, METHOD OF MANUFACTURING THE SAME, AND LITHIUM SECONDARY BATTERY INCLUDING THE MATERIAL

(71) Applicant: Samsung SDI Co., Ltd., Yongin-si, Gyeonggi-do (KR)

(72) Inventors: Hyun Cheol Lee, Daejeon (KR); Woo Young Yang, Daejeon (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 202 days.

(21) Appl. No.: 13/818,549

(22) PCT Filed: Dec. 27, 2012

(86) PCT No.: PCT/KR2012/011616
§ 371 (c)(1),
(2) Date: May 20, 2013

(87) PCT Pub. No.: WO2013/100651
PCT Pub. Date: Jul. 4, 2013

(65) Prior Publication Data
US 2014/0057181 A1 Feb. 27, 2014

(30) Foreign Application Priority Data
Dec. 30, 2011 (KR) .......................... 10-2011-0147352

(51) Int. Cl.
*H01M 10/056* (2010.01)
*H01M 4/525* (2010.01)
*H01M 10/058* (2010.01)
(Continued)

(52) U.S. Cl.
CPC ............ *H01M 10/056* (2013.01); *H01M 4/525* (2013.01); *H01M 4/5825* (2013.01); *H01M 4/62* (2013.01); *H01M 10/058* (2013.01); *H01M 4/366* (2013.01); *H01M 4/505* (2013.01); *H01M 10/052* (2013.01); *H01M 2300/0045* (2013.01); *Y02E 60/122* (2013.01)

(58) Field of Classification Search
CPC ..... H01M 10/056; H01M 4/62; H01M 4/525; H01M 4/5825; H01M 10/058; H01M 4/366; H01M 10/052; H01M 4/505
See application file for complete search history.

(56) References Cited

U.S. PATENT DOCUMENTS

| | | | |
|---|---|---|---|
| 2004/0191633 A1 | 9/2004 | Johnson et al. | |
| 2008/0050655 A1* | 2/2008 | Chu et al. | 429/231.8 |
| 2011/0151317 A1* | 6/2011 | Giroud et al. | 429/162 |

FOREIGN PATENT DOCUMENTS

| | | | | |
|---|---|---|---|---|
| JP | 2007-311296 A | 11/2007 | | |
| WO | WO2009031036 | * 3/2009 | ............. | H01M 4/36 |

OTHER PUBLICATIONS

Extended European Search Report dated Sep. 9, 2015 in Corresponding European Patent Application No. 12824681.6.

*Primary Examiner* — Muhammad Siddiquee
(74) *Attorney, Agent, or Firm* — Lee & Morse, P.C.

(57) ABSTRACT

Provided is a positive electrode active material for a lithium secondary battery including a positive electrode active material particle and an electrolyte-containing metal oxide coating layer having a porous structure and a method of manufacturing the same. A lithium secondary battery to which the positive electrode active material including the electrolyte-containing metal oxide coating layer is applied can have improved charge/discharge efficiency and lifespan characteristics at the same time.

10 Claims, 3 Drawing Sheets

(51) Int. Cl.
   *H01M 4/58*   (2010.01)
   *H01M 4/62*   (2006.01)
   *H01M 4/36*   (2006.01)
   *H01M 10/052*   (2010.01)
   *H01M 4/505*   (2010.01)

POSITIVE ELECTRODE ACTIVE MATERIAL FOR LITHIUM SECONDARY BATTERY, METHOD OF MANUFACTURING THE SAME, AND LITHIUM SECONDARY BATTERY INCLUDING THE MATERIAL

TECHNICAL FIELD

The present invention relates to a positive electrode active material for a lithium secondary battery, a method of manufacturing the same, and a lithium secondary battery including the material, and more particularly, to a positive electrode active material for a lithium secondary battery, a method of manufacturing the same, and a lithium secondary battery including the material, in which the positive electrode active material may be coated with an electrolyte-containing porous metal oxide to improve charge/discharge efficiency and lifespan characteristics.

BACKGROUND ART

Recently, with the development of portable devices, such as portable phones, laptop computers, and camcorders, the demand for small-sized secondary batteries such as lithium secondary batteries has increased. In particular, a vast amount of research has been conducted into lithium secondary batteries using lithium and a non-aqueous solvent serving as an electrolyte because it is highly likely to form small-sized, lightweight batteries having a high energy density.

Positive electrode active materials of lithium secondary batteries include lithium cobalt oxide (LCO)-based materials (e.g., $LiCoO_2$), nickel cobalt manganese (NCM)-based materials (e.g., $LiNi_{1/3}Co_{1/3}Mn_{1/3}O_2$ or $LiNi_{0.5}Co_{0.2}Mn_{0.3}O_2$), and OLO-based materials, which have layered crystal structures, LMO-based materials (e.g., $LiMn_2O_4$) having spinel crystal structures, and lithium iron phosphate (LFP)-based materials (e.g., $LiMPO_4$) having olivine structures.

The LCO-based materials, which are typical positive electrode active materials, have excellent lifespans and conductive characteristics but have small capacities and require expensive raw materials. Also, since the NCM-based positive electrode active materials can obtain neither high charge/discharge efficiency nor high temperature characteristics, the NCM-based materials do not have reliable battery safety yet.

In addition, the LFP-based materials are very stable at high temperatures and have attracted much attention as inexpensive positive electrode active materials because the LFP-based materials do not require high-priced elements, such as cobalt or nickel. However, when a battery is configured by bonding a positive electrode formed using an LFP-based material as an active material with an electrolyte, a negative electrode, and a separator, a transition metal M may be eluted into the electrolyte. Also, when the eluted transition metal reacts with the electrolyte and generates gases, battery safety may be threatened. Furthermore, when the eluted transition metal is precipitated in a metal phase on the opposite negative electrode, intercalation and deintercalation of lithium ions may be hindered, thereby causing a voltage drop or shortening the lifespan of the battery.

Thus, many attempts have been made to improve lifespan characteristics of positive electrode active materials for lithium secondary batteries in the field of batteries, and there is still a demand for positive electrode active materials with improved lifespan characteristics.

Among such attempts, to increase the lifespan characteristics of the positive electrode active material for the lithium secondary battery, a method of forming a metal oxide coating layer 30 on the surface of a positive electrode active material 10 by blending the positive electrode active material 10 with a metal oxide precursor 20 has been proposed as shown in FIG. 1. However, this method may actually lower efficiency because the metal oxide coating layer 30 formed on the surface of the positive electrode active material 10 does not have ionic conductivity.

Therefore, the present inventors discovered that when a porous metal oxide containing a material having lithium ion conductivity is coated on a conventional positive electrode active material, conduction of lithium ions between an external electrolyte and the positive electrode active material under coating layer may be facilitated, thereby maintaining lifespan characteristics and improving efficiency, and thus completed the present invention.

DISCLOSURE

Technical Problem

The present inventors completed the present invention in an attempt to obviate general disadvantages and problems of the above-described conventional art.

Accordingly, the present invention is directed to a positive electrode active material capable of increasing charge/discharge efficiency and lifespan characteristics of a lithium secondary battery.

Also, the present invention is directed to a method of manufacturing a positive electrode active material, which may increase charge/discharge efficiency and lifespan characteristics of a lithium secondary battery.

Furthermore, the present invention is directed to a lithium secondary battery including a positive electrode active material capable of increasing charge/discharge efficiency and lifespan characteristics of a lithium secondary battery.

The technical objectives of the present invention are not limited to the above disclosure; other objectives may become apparent to those of ordinary skill in the art based on the following descriptions.

Technical Solution

One aspect of the present invention provides a positive electrode active material for a lithium secondary battery. The material includes a positive electrode active material particle, and an electrolyte-containing metal oxide coating layer having a porous structure and formed on the surface of the positive electrode active material particle.

The positive electrode active material is at least one selected from the group consisting of materials having the following structure including: $Li_xMPO_4$ (here, M is selected from the group consisting of iron (Fe), manganese (Mn), cobalt (Co), nickel (Ni), copper (Cu), zinc (Zn), magnesium (Mg), chromium (Cr), vanadium (V), molybdenum (Mo), titanium (Ti), aluminum (Al), niobium (Nb), and gallium (Ga), and $0.05 \leq x \leq 1.2$); $LiMO_2$ (here, M is at least one selected from the group consisting of transition metal elements); $LiNi_xCo_yMn_zO_2$ (here, x+y+z=1); $xLiMO_2 \cdot (1-x)Li_2M'O_3$ (here, 0<x<1, M includes at least one metal element having an average oxidation number of +3 and includes at least one Ni element, and M' includes at least one metal element having an average oxidation number of +4); and $LiM_2O_4$ (here, M is at least one selected from the group consisting of transition metal elements).

The metal oxide coated on the positive electrode active material particle is one selected from the group consisting of $Al_2O_3$, $SiO_2$, $ZrO_2$, $TiO_2$, CoO, $Fe_2O_3$, CaO, and $SnO_2$. The metal oxide is nanoscale particle.

An electrolyte contained in the metal oxide is an ionic liquid selected from the group consisting of an imidazolium-based material, a pyrrolidinium-based material, a tetraalkylammonium-based material, a piperidinium-based material, a pyridinium-based material, and a sulfonium-based material.

The electrolyte-containing metal oxide has a porous structure having open pores with a size of about 1 nm to about 100 nm.

Another aspect of the present invention provides a method of preparing a positive electrode active material for a lithium secondary battery. The method includes: causing a reaction of an ionic electrolyte with a metal oxide having a porous structure to form an electrolyte-containing metal oxide; and coating a positive electrode active material particle with the electrolyte-containing metal oxide.

The forming of the electrolyte-containing metal oxide may include putting an ionic electrolyte into the metal oxide while forming the metal oxide to have the porous structure or putting an ionic electrolyte into the metal oxide after forming the metal oxide to have the porous structure.

The coating of the positive electrode active material particle may include blending the electrolyte-containing metal oxide with the positive electrode active material and solidifying the mixture.

Another aspect of the present invention provides a lithium secondary battery including a positive electrode active material including: a positive electrode active material particle, and an electrolyte-containing metal oxide coating layer having a porous structure and formed on the surface of the positive electrode active material particle.

Advantageous Effects

According to the present invention, a porous metal oxide is used instead of a simple metal oxide, an electrolyte-type material having ionic conductivity is contained during preparation of the metal oxide, and the porous metal oxide containing the electrolyte-type material is coated on a positive electrode active material so that a dead space region between the positive electrode active material and an electrolyte can be minimized. Also, a reduction in ionic conductivity caused by the coating process can be prevented, thereby generally increasing charge/discharge efficiency, rate capability, and lifespan characteristics at the same time.

MODE FOR INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
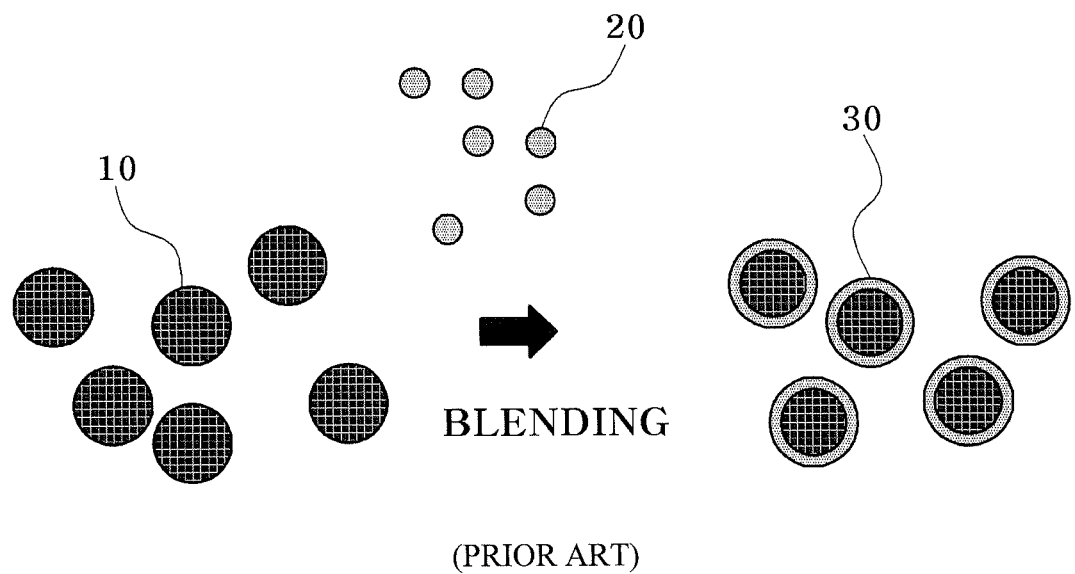
FIG. 1 is a schematic diagram of a process of coating a conventional positive electrode active material with a metal oxide.
Figure 2:
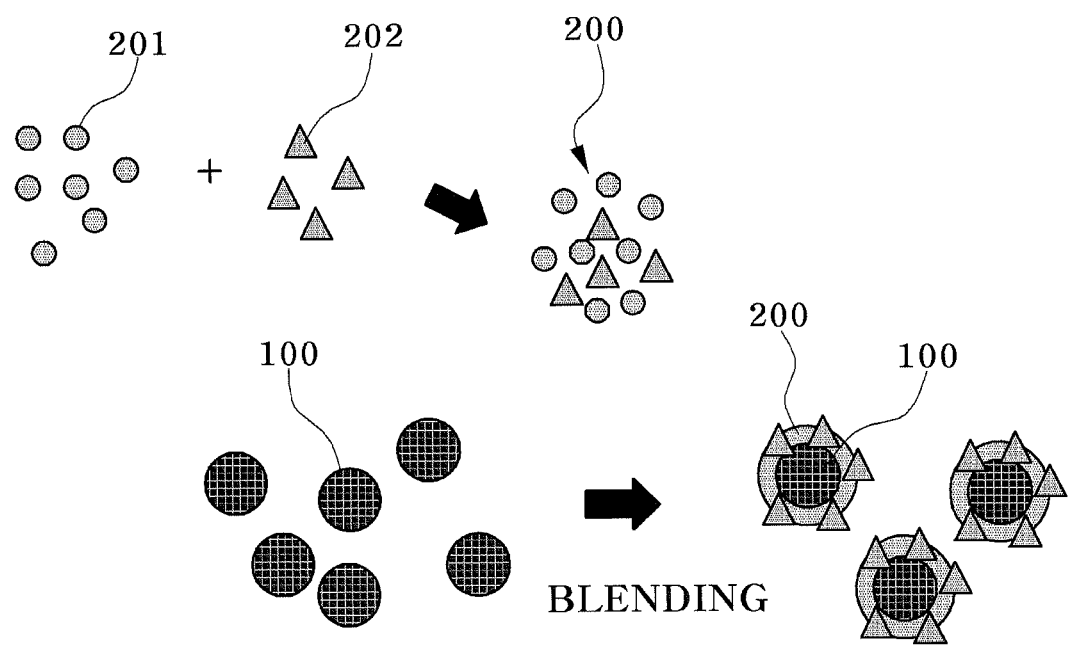
FIG. 2 is a schematic diagram of a process of forming an electrolyte-containing metal oxide and a process of coating a positive electrode active material with the electrolyte-containing metal oxide according to an exemplary embodiment of the present invention.

FIG. 2 is a schematic diagram of a process of forming an electrolyte-containing metal oxide and a process of coating a positive electrode active material with the electrolyte-containing metal oxide according to an exemplary embodiment of the present invention.

Referring to FIG. 2, a positive electrode active material for a lithium secondary battery according to the present invention includes a positive electrode active material particle 100 and an electrolyte-containing metal oxide coating layer 200 formed on the surface of the positive electrode active material particle 100.

The positive electrode active material particle 100 may be a positive electrode active material particle typical in the art, and preferably has the following structure including:

$Li_xMPO_4$ (here, M is selected from the group consisting of iron (Fe), manganese (Mn), cobalt (Co), nickel (Ni), copper (Cu), zinc (Zn), magnesium (Mg), chromium (Cr), vanadium (V), molybdenum (Mo), titanium (Ti), aluminum (Al), niobium (Nb), and gallium (Ga), and $0.05 \leq x \leq 1.2$); $LiMO_2$ (here, M is at least one selected from the group consisting of transition metal elements); $LiNi_xCo_yMn_zO_2$ (here, $x+y+z=1$); $xLiMO_2 \cdot (1-x)Li_2M'O_3$ (here, $0<x<1$, M includes at least one metal element having an average oxidation number of +3 and includes at least one Ni element, and M' includes at least one metal element having an average oxidation number of +4); and $LiM_2O_4$ (here, M is at least one selected from the group consisting of transition metal elements).

The $Li_xMPO_4$ has an olivine crystal structure, and the $LiMO_2$, $LiNi_xCo_yMn_zO_2$, and $xLiMO_2 \cdot (1-x)Li_2M'O_3$ have layered crystal structures and include, for example, $LiCoO_2$, $LiNi_{1/3}Co_{1/3}Mn_{1/3}O_2$, or $LiNi_{0.5}Co_{0.2}Mn_{0.3}O_2$. The $LiM_2O_4$ has a spinel crystal structure and is typically $LiMn_2O_4$. Here, M is mainly Mn and may be $Ni_{0.5}Mn_{1.5}$.

In the electrolyte-containing metal oxide coating layer 200, a metal oxide 201 may be a selected metal oxide capable of improving lifespan characteristics of the positive electrode active material and forming a porous structure. Preferably, the metal oxide 201 may be one selected from the group consisting of $Al_2O_3$, $SiO_2$, $ZrO_2$, $TiO_2$, CoO, $Fe_2O_3$, CaO, and $SnO_2$.

In addition, the metal oxide 201 may be nanoscale and have a porous structure with open pores. Each of the open pores of the porous structure preferably has a size of about 1 nm to about 100 nm.

Furthermore, an electrolyte 202 contained in the metal oxide 201 is preferably a material having ionic conductivity to prevent degradation of battery characteristics due to the coating of the metal oxide 201 on the positive electrode active material particle 100. Specifically, the electrolyte 202 is preferably an ionic liquid selected from the group consisting of an imidazolium-based material, a pyrrolidinium-based material, a tetraalkylammonium-based material, a piperidinium-based material, a pyridinium-based material, and a sulfonium-based material. Also, an ionically conductive polymer may be used as the electrolyte 202.

The electrolyte 202 is preferably contained at a content of about 10 to 70% by volume with respect to the metal oxide 201. When the content of the electrolyte 202 contained in the metal oxide 201 is less than the content range, sufficient ionic conductivity cannot be provided, whereas when the content of the electrolyte 202 contained in the metal oxide 201 exceeds the content range, the porous metal oxide 201 cannot contain the entire electrolyte injected.

In addition, the metal oxide 201 containing the electrolyte 202 preferably has a porous structure having open pores with a size of about 1 nm to about 100 nm. The contained electrolyte 202 may be connected to the outside through the open pores of the metal oxide 201, and used as a connection path between the positive electrode active material and an external electrolyte on the surface of the positive electrode active material.

Figure 3:
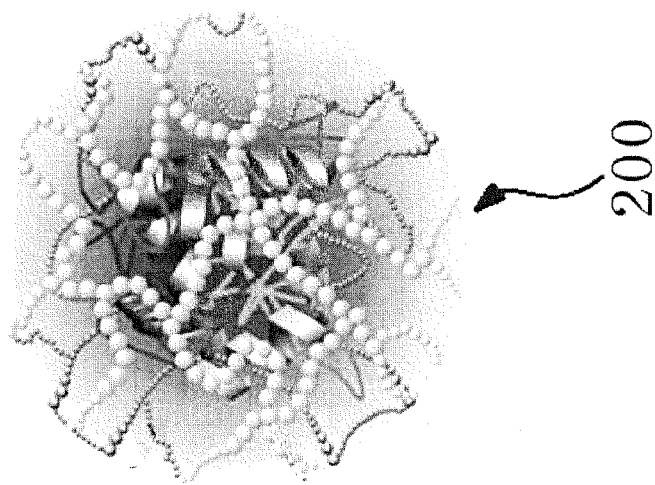
FIG. 3 is a schematic diagram of a process of forming an electrolyte-containing metal oxide according to an exemplary embodiment of the present invention.
Figure 3:
Figure 3:
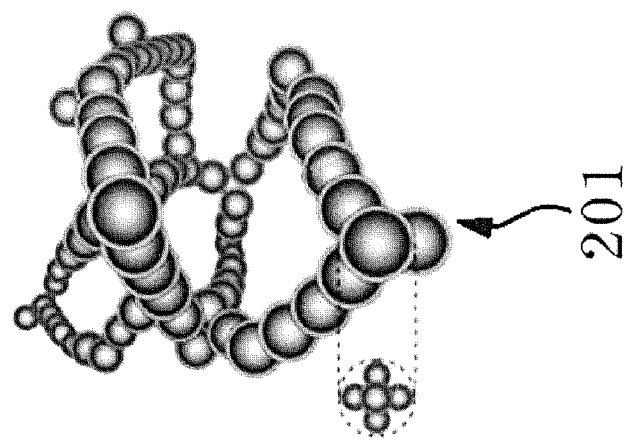
Figure 3:
Figure 3:
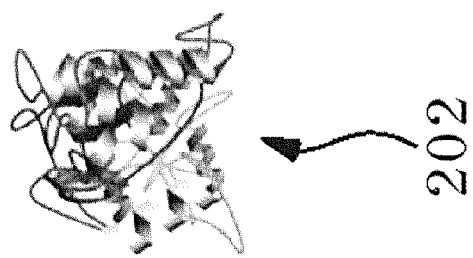
Figure 4:
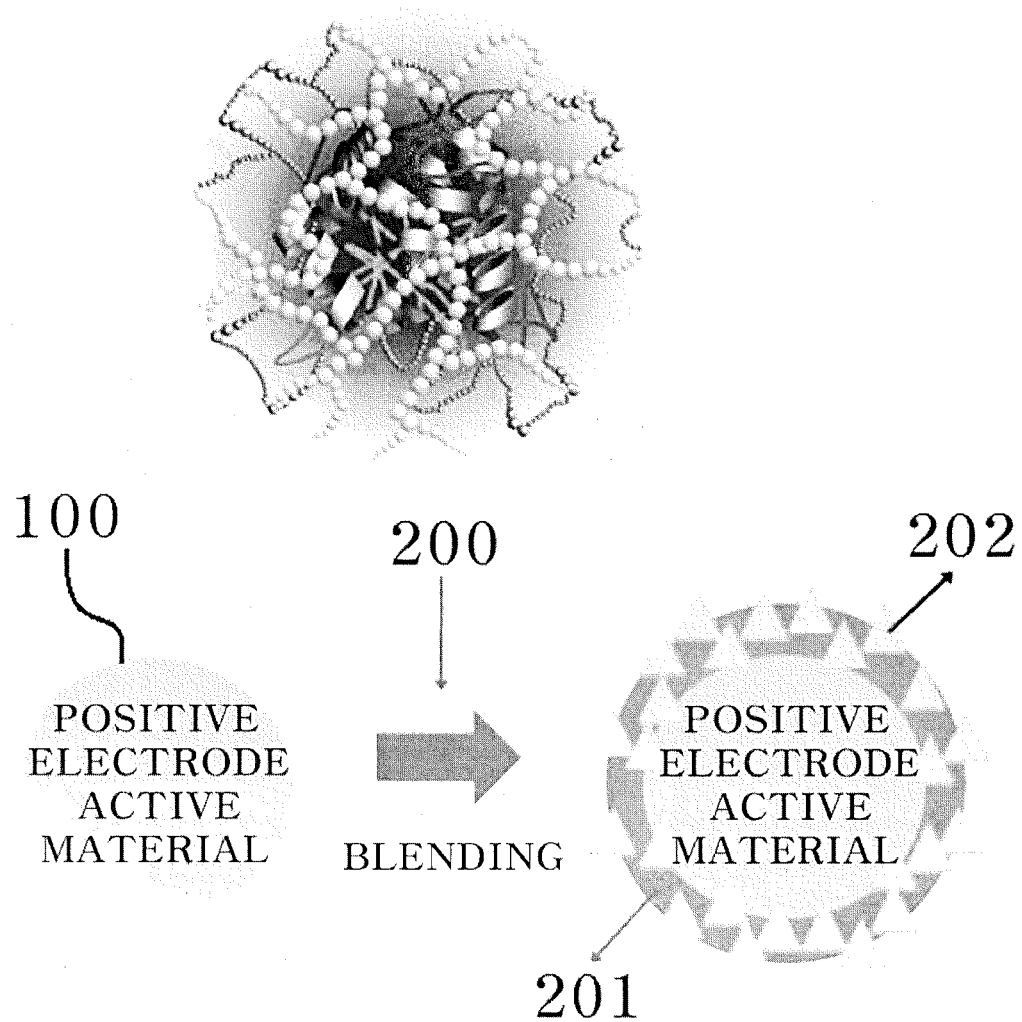
FIG. 4 is a schematic diagram of a process of coating an electrolyte-containing metal oxide on a positive electrode active material according to an exemplary embodiment of the present invention.

FIG. 3 is a schematic diagram of a process of forming an electrolyte-containing metal oxide according to an exemplary embodiment of the present invention, and FIG. 4 is a schematic diagram of a process of coating an electrolyte-containing metal oxide on a positive electrode active material according to an exemplary embodiment of the present invention.

Referring to FIGS. 3 and 4, a method of manufacturing a positive electrode active material for a lithium secondary battery according to the present invention includes causing a reaction of a metal oxide 201 having a porous structure with an ionic electrolyte 202 to form an electrolyte-containing metal oxide 200; and coating a positive electrode active material particle 100 with the electrolyte-containing metal oxide 200 having the porous structure.

The formation of the electrolyte-containing metal oxide 200 preferably includes introducing an ionic electrolyte while or after forming the metal oxide to have the porous structure. For example, the porous structure of the metal oxide may be cross-linked using a sol-gel process. The ionic electrolyte may be injected and contained during the cross-linking process or absorbed after forming a crosslinking structure (or porous structure).

As shown in FIG. 3, the electrolyte-containing metal oxide 200 having the porous structure may be formed by putting the ionic electrolyte 202 in the metal oxide 201 having the porous structure. The electrolyte-containing metal oxide 200 having the porous structure has open pores with a size of about 1 nm to about 100 nm.

The metal oxide 201 may be a selected metal oxide capable of being manufactured to have a porous structure and improving lifespan characteristics of the positive electrode active material. Specifically, the metal oxide 201 is one selected from the group consisting of $Al_2O_3$, $SiO_2$, $ZrO_2$, $TiO_2$, CoO, $Fe_2O_3$, CaO, and $SnO_2$.

In the metal oxide 201 having the porous structure, the open pores preferably have a size of about 1 nm to about 100 nm.

In addition, the ionic electrolyte 202 is preferably a material having ionic conductivity, which may prevent degradation of battery characteristics due to the coating of the positive electrode active material particle 100 with the metal oxide 201. Specifically, the ionic electrolyte 202 is preferably an ionic liquid selected from the group consisting of an imidazolium-based material, a pyrrolidinium-based material, a tetraalkylammonium-based material, a piperidinium-based material, a pyridinium-based material, and a sulfonium-based material. Also, an ionically conductive polymer may be used as the ionic electrolyte 202.

The electrolyte 202 is preferably contained at a content of about 10 to 70% by volume with respect to the metal oxide 201.

The coating of the positive electrode active material particle 100 with the electrolyte-containing metal oxide 200 having the porous structure includes blending the positive electrode active material particle 100 with the electrolyte-containing metal oxide 200 and solidifying the mixture.

In this case, the solidification of the mixture preferably includes solidifying the coated material using a natural drying process or a thermal treatment.

The electrolyte-containing metal oxide 200 may be coated on the positive electrode active material particle 100 to a thickness of about 1 nm to about 100 nm.

EXAMPLE

Preparation of Positive Electrode Active Material Coated with Electrolyte-Containing Metal Oxide A silicate precursor obtained by blending tetramethyl orthosilicate (TMOS) with triethoxy vinyl silane (a silane derivative) was blended with formic acid and 1-butyl-3-methylimidazolium tetrafluoroborate ($BMIMBF_4$) serving as an ionic electrolyte in a volume ratio of 1.0:0.5:1.0. The resultant mixture was ultrasonically treated and cooled down to a temperature of about −10° C. to form an electrolyte-containing silica gel. Thereafter, $LiNi_{0.5}Co_{0.2}Mn_{0.3}O_2$ serving as a positive electrode active material of a lithium secondary battery was blended with the electrolyte-containing silica. The resultant mixture was thermally treated at a temperature of about 300° C. for about 10 minutes to prepare a positive electrode active material coated with the electrolyte-containing silica to a thickness of about 5 nm. $BMIMBF_4$ serving as the ionic electrolyte had ionic conductivity of about 1.70 mS/cm, and $BMIMBF_4$-containing silica had ionic conductivity of about 0.44 mS/cm.

Comparative Example 1

For comparison, a positive electrode active material that was not coated with an electrolyte-containing metal oxide was prepared.

Comparative Example 2

For comparison, a positive electrode active material coated with a typical metal oxide was prepared. Specifically, silica sol was generated by blending TMOS serving as a silica precursor with formic acid in a volume ratio of about 1.0:0.5, and $LiNi_{0.5}CO_{0.2}Mn_{0.3}O_2$ serving as a positive electrode active material was blended with the silica sol. The resultant mixture was thermally treated at a temperature of about 300° C. for about 10 minutes to prepare a positive electrode active material coated with silica to a thickness of about 5 nm.

Estimation Example

Manufacture of Batteries

Batteries were manufactured using powder of the respective positive electrode active materials prepared in Example and Comparative examples 1 and 2. Specifically, powder of each of the positive electrode active materials was blended with a polyvinylidene fluoride binder, Super P carbon black, a 6N-methylpyrrolidone (NMP) solution to prepare a mixture. The prepared mixture was coated on aluminum foil (Al foil) to manufacture a pole plate. The pole plate was used as a positive electrode, and a cell having a size of about 2 cm×2 cm was formed using lithium metal as a negative electrode. A solution obtained by blending ethylene carbonate (EC) in which 1 M $LiPF_6$ was dissolved with dimethyl carbonate (DMC) in a volume ratio of 1:1 was used as an electrolyte. Charge/discharge experiments were conducted with cells (or batteries) containing powder of the respective positive electrode active materials, and experimental results are shown in Tables 1 through 3.

TABLE 1

Charge/discharge experimental results of Example (positive electrode active material coated with electrolyte-containing metal oxide)

| C rate | Charge (mAh/g) | Discharge (mAh/g) | Charge/discharge efficiency (D/C) | Rate capability |
|---|---|---|---|---|
| FM (Initial capacity) | 192.48 | 171.2 | 88.9% | 100.0% |
| 0.2 C | 175.8 | 168.8 | 96.0% | 98.6% |
| 0.5 C | 169.8 | 163.7 | 96.4% | 95.6% |
| 1 C | 163.2 | 155.4 | 95.2% | 90.8% |
| 2 C | 159.4 | 150.4 | 94.4% | 87.9% |

Charge/discharge efficiency of 86.1% after performing cycling 50 times (0.5 C)

TABLE 2

Charge/discharge experimental results of Comparative example 1 (uncoated positive electrode active material)

| C rate | Charge (mAh/g) | Discharge (mAh/g) | Charge/discharge efficiency (D/C) | Rate capability |
|---|---|---|---|---|
| FM (Initial capacity) | 191.07 | 167.5 | 87.7% | 100.0% |
| 0.2 C | 172.74 | 160.7 | 93.0% | 95.9% |
| 0.5 C | 167.46 | 157.8 | 94.2% | 94.2% |
| 1 C | 161.91 | 150.2 | 92.8% | 89.7% |
| 2 C | 156.98 | 139.7 | 89.0% | 83.4% |

Charge/discharge efficiency of 80.4% after performing cycling 50 times (0.5 C)

TABLE 3

Charge/discharge experimental results of Comparative example 2 (positive electrode active material coated with metal oxide)

| C rate | Charge (mAh/g) | Discharge (mAh/g) | Charge/discharge efficiency (D/C) | Rate capability |
|---|---|---|---|---|
| FM (Initial capacity) | 187.9 | 164.2 | 87.4% | 100.0% |
| 0.2 C | 169.7 | 157.9 | 93.0% | 96.2% |
| 0.5 C | 159.78 | 147.5 | 92.3% | 89.8% |
| 1 C | 156.8 | 143.9 | 91.8% | 87.6% |
| 2 C | 149.9 | 131.7 | 87.9% | 80.2% |

Charge/discharge efficiency of 83.2% after performing cycling 50 times (0.5 C)

As can be seen from Tables 1 through 3, a battery using a positive electrode active material coated with an electrolyte-containing metal oxide had improved charge/discharge efficiency, rate capability, and lifespan characteristics at the same time.

While the invention has been shown and described with reference to m certain exemplary embodiments thereof, it will be understood by those skilled in the art that various changes in form and details may be made therein without departing from the spirit and scope of the invention as defined by the appended claims.

The invention claimed is:

1. A positive electrode active material for a lithium secondary battery, the material comprising:
    a positive electrode active material particle; and
    an electrolyte-containing metal oxide coating layer having a porous structure and formed on the surface of the positive electrode active material particle,
    wherein an electrolyte of the electrolyte-containing metal oxide coating layer comprises an ionic liquid selected from a group consisting of an imidazolium-based material, a pyrrolidinium-based material, a tetraalkylammonium-based material, a piperidinium-based material, a pyridinium-based material, and a sulfonium-based material.

2. The material according to claim 1, wherein the positive electrode active material is at least one selected from a group consisting of:
    $Li_xMPO_4$ wherein M is selected from a group consisting of iron (Fe), manganese (Mn), cobalt (Co), nickel (Ni), copper (Cu), zinc (Zn), magnesium (Mg), chromium (Cr), vanadium (V), molybdenum (Mo), titanium (Ti), aluminum (Al), niobium (Nb), and gallium (Ga), and $0.05 \leq x \leq 1.2$;
    $LiMO_2$ wherein M is at least one selected from a group consisting of transition metal elements;
    $LiNi_xCo_yMn_zO_2$ wherein $x+y+z=1$;
    $xLiMO_2(1-x)Li_2M'O_3$ wherein $0<x<1$, M includes at least one metal element having an average oxidation number of +3 and includes at least one Ni element, and M' includes at least one metal element having an average oxidation number of +4; and
    $LiM_2O_4$ wherein M is at least one selected from a group consisting of transition metal elements.

3. The material according to claim 1, wherein the electrolyte-containing metal oxide coating layer comprises a metal oxide selected from a group consisting of $Al_2O_3$, $SiO_2$, $ZrO_2$, $TiO_2$, $CoO$, $Fe_2O_3$, $CaO$, and $SnO_2$.

4. The material according to claim 1, wherein the porous structure of the electrolyte-containing metal oxide coating layer has open pores with a size of about 1 nm to about 100 nm.

5. The material according to claim 1, wherein the metal oxide of the electrolyte-containing metal oxide coating layer is nanoscale.

6. A method of preparing a positive electrode active material for a lithium secondary battery, the method comprising:
    forming an electrolyte-containing metal oxide by reacting an ionic electrolyte with a metal oxide having a porous structure; and
    coating a positive electrode active material with the electrolyte-containing metal oxide, wherein an electrolyte of the electrolyte-containing metal oxide coating layer comprises an ionic liquid selected from a group consisting of an imidazolium-based material, a pyrrolidinium-based material, a tetraalkylammonium-based material, a piperidinium-based material, a pyridinium-based material, and a sulfonium-based material.

7. The method according to claim 6, wherein the forming of the electrolyte-containing metal oxide comprises putting an ionic electrolyte into the metal oxide while forming the metal oxide to have the porous structure.

8. The method according to claim 6, wherein the forming of the electrolyte-containing metal oxide comprises putting an ionic electrolyte into the metal oxide after forming the metal oxide to have the porous structure.

9. The method according to claim 6, wherein the coating of the positive electrode active material comprises blending the electrolyte-containing metal oxide with the positive electrode active material to form a mixture and solidifying the mixture.

10. A lithium secondary battery comprising the positive electrode active material according to claim 1.

* * * * *